United States Patent
Kim

(10) Patent No.: US 10,902,290 B1
(45) Date of Patent: Jan. 26, 2021

(54) METHODS FOR TRAINING AUTO LABELING DEVICE AND PERFORMING AUTO LABELING RELATED TO OBJECT DETECTION WHILE PERFORMING AUTOMATIC VERIFICATION BY USING UNCERTAINTY SCORES AND DEVICES USING THE SAME

(71) Applicant: Superb AI Co., Ltd., Seoul (KR)

(72) Inventor: Kye-Hyeon Kim, Seoul (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 16/984,607

(22) Filed: Aug. 4, 2020

(51) Int. Cl.
*G06K 9/62* (2006.01)
*G06T 7/70* (2017.01)
*G06N 3/08* (2006.01)
*G06N 3/04* (2006.01)
*G06T 11/00* (2006.01)

(52) U.S. Cl.
CPC ......... *G06K 9/6259* (2013.01); *G06K 9/6232* (2013.01); *G06K 9/6267* (2013.01); *G06N 3/04* (2013.01); *G06N 3/08* (2013.01); *G06T 7/70* (2017.01); *G06T 11/00* (2013.01); *G06T 2207/20081* (2013.01); *G06T 2210/12* (2013.01)

(58) Field of Classification Search
CPC .. G06K 9/6259; G06K 9/6232; G06K 9/6267; G06T 7/70; G06T 11/00; G06T 2207/20081; G06T 2210/12; G06N 3/04; G06N 3/08
See application file for complete search history.

(56) References Cited

U.S. PATENT DOCUMENTS

| | | | |
|---|---|---|---|
| 6,169,940 B1* | 1/2001 | Jitsukata | B62D 1/28 340/903 |
| 8,995,956 B2* | 3/2015 | Lavi | H04W 84/22 455/410 |
| 9,672,734 B1* | 6/2017 | Ratnasingam | G08G 1/0968 |
| 10,503,988 B2* | 12/2019 | Cordell | G06K 9/00798 |
| 10,733,431 B2* | 8/2020 | Zhang | G06K 9/00369 |
| 2010/0250106 A1* | 9/2010 | Bai | G08G 1/161 701/117 |
| 2015/0154457 A1* | 6/2015 | Datta | G06K 9/6256 382/104 |
| 2017/0083792 A1* | 3/2017 | Rodriguez-Serrano | G06T 7/10 |
| 2018/0150684 A1* | 5/2018 | Wang | G06K 9/6256 |

(Continued)

*Primary Examiner* — Utpal D Shah
(74) *Attorney, Agent, or Firm* — Xsensus LLP

(57) ABSTRACT

A method for training an auto labeling device performing verification using uncertainty scores of auto-labeled labels is provided. The method includes steps of: a learning device (a) (i) inputting first unlabeled images into a feature pyramid network (FPN) to generate first pyramid feature maps, (ii) allowing an object detection network to generate first bounding boxes, and (iii) training the object detection network and the FPN; (b) (i) allowing the FPN to generate second pyramid feature maps and allowing the object detection network to generate second bounding boxes, (ii) instructing an ROI pooling layer to generate pooled feature maps and inputting the pooled feature maps into at least one of a first classifier to generate first class scores and first box uncertainty scores, and a second classifier to generate second class scores and second box uncertainty scores and (iii) training one of the first classifier and the second classifier.

20 Claims, 7 Drawing Sheets

(56) References Cited

U.S. PATENT DOCUMENTS

| | | | |
|---|---|---|---|
| 2018/0170375 A1* | 6/2018 | Jang | G06K 9/00845 |
| 2019/0049957 A1* | 2/2019 | Healey | A61B 5/18 |
| 2019/0065868 A1* | 2/2019 | Tran | G06K 9/66 |
| 2019/0108396 A1* | 4/2019 | Dal Mutto | G06T 7/174 |
| 2019/0113917 A1* | 4/2019 | Buch | G06N 3/0454 |
| 2019/0114489 A1* | 4/2019 | Jackson | G06K 9/6289 |
| 2019/0130762 A1* | 5/2019 | Yang | H04W 4/40 |
| 2019/0152492 A1* | 5/2019 | el Kaliouby | B60W 30/10 |
| 2019/0180115 A1* | 6/2019 | Zou | G06N 3/0454 |
| 2019/0228236 A1* | 7/2019 | Schlicht | B60R 16/023 |
| 2019/0333232 A1* | 10/2019 | Vallespi-Gonzalez | G06N 5/022 |
| 2019/0361118 A1* | 11/2019 | Murad | G01S 17/931 |
| 2019/0384303 A1* | 12/2019 | Muller | G06K 9/00791 |
| 2020/0097820 A1* | 3/2020 | Song | G06N 3/08 |
| 2020/0242451 A1* | 7/2020 | Cao | G06N 3/0481 |

* cited by examiner p($y_1|α_1$) DISTRIBUTION p($y_2|α_2$) DISTRIBUTION

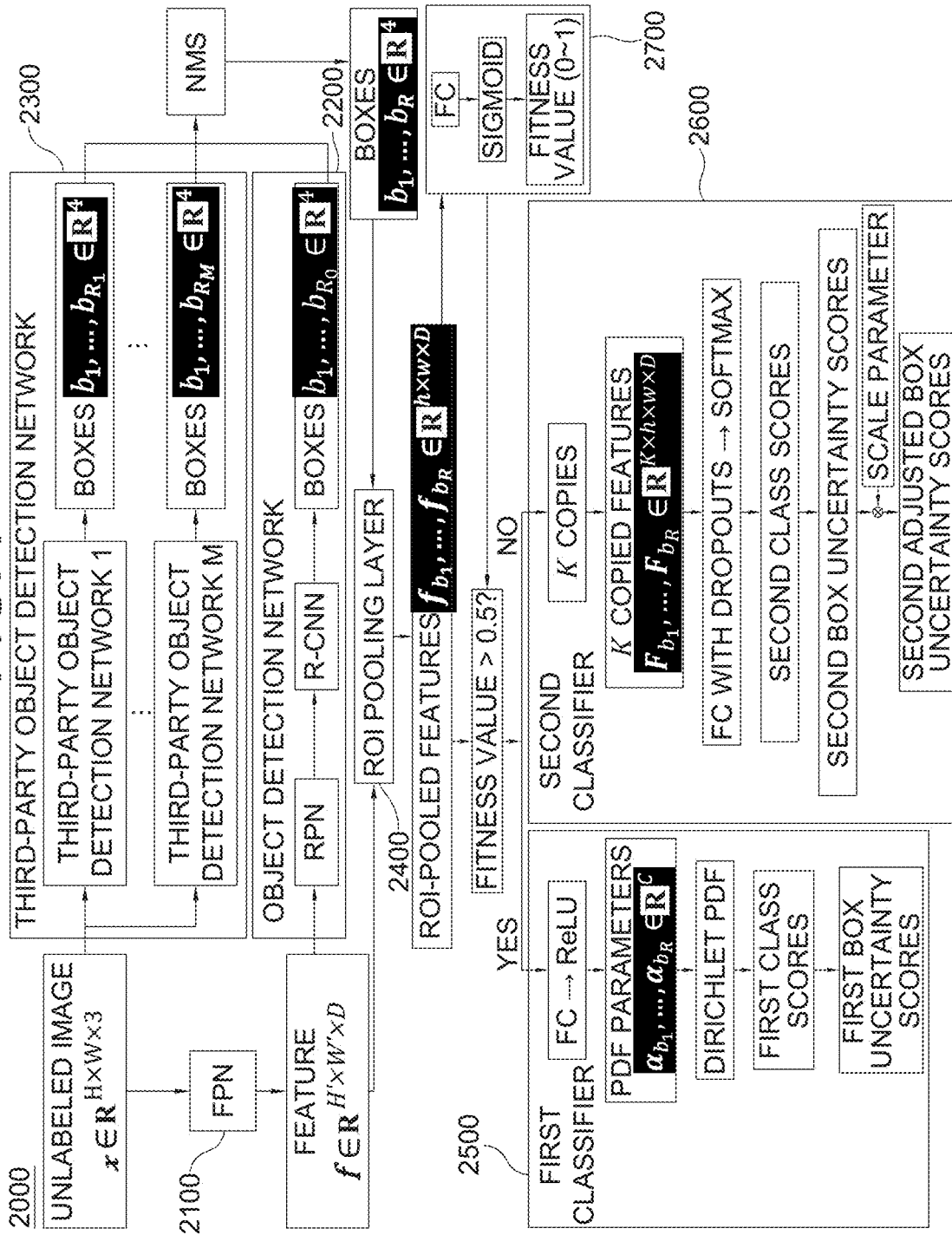

METHODS FOR TRAINING AUTO LABELING DEVICE AND PERFORMING AUTO LABELING RELATED TO OBJECT DETECTION WHILE PERFORMING AUTOMATIC VERIFICATION BY USING UNCERTAINTY SCORES AND DEVICES USING THE SAME

FIELD OF THE DISCLOSURE

The present disclosure relates to methods for training an auto labeling device and auto labeling and devices using the same; and more particularly, to the method for training the auto labeling device and the auto labeling while performing automatic verification by using uncertainty scores and the devices using the same.

BACKGROUND OF THE DISCLOSURE

Recently, methods of performing object identification and the like making use of machine learning are being studied. As part of a family of machine learning methods, deep learning, which uses a neural network with several hidden layers between an input layer and an output layer, shows high performance in recognition.

And, the neural network using the deep learning is generally trained through backpropagation using losses.

In order to perform such training of the deep learning network, training data are needed in which labels are added to individual data by labelers. Preparing these training data (i.e. classifying the data correctly) can be very labour-intensive, expensive and inconvenient, especially if a large amount of the training data is to be used and if the quality of the data pre-preparation is not consistently high. Conventional interactive labeling can be computationally expensive and may fail to deliver good results.

Therefore, recently, auto labeling which adds labels to training images using a deep learning-based automatic labeling device is popular, and inspectors may inspect the auto-labeled training images to correct the labels.

However, in such a conventional method, throughputs of the inspectors are low as compared to the throughput of the automatic labeling device. Therefore, it takes a long time to generate true labels for entire training images. In order to improve the overall throughput, the number of the inspectors must be increased, but it results in an increase of the cost.

Also, it is difficult to acquire a large number of the inspectors skilled enough to keep up with the throughput of the automatic labeling device.

SUMMARY OF THE DISCLOSURE

It is an object of the present disclosure to solve all the aforementioned problems.

It is another object of the present disclosure to improve a throughput of auto labeling for entire training images.

It is still another object of the present disclosure to maintain a maximal throughput of the auto labeling, while reducing the number of inspectors.

It is still yet another object of the present disclosure to allow unskilled inspectors to perform label-inspecting keeping up with a throughput of the auto labeling device.

It is still yet another object of the present disclosure to improve the throughput of the auto labeling, without degrading an accuracy of the auto labeling.

In order to accomplish objects above and characteristic effects to be described later of the present disclosure, distinctive structures of the present disclosure are described as follows.

In accordance with one aspect of the present disclosure, there is provided a method for training an auto labeling device capable of performing automatic verification by using uncertainty scores of auto-labeled labels, including steps of: (a) a learning device performing (i) a process of inputting or allowing the auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (ii) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (iii) a process of training the object detection network and the feature pyramid network, using one or more first losses calculated by referring to the first bounding boxes for training and ground truths of the first unlabeled training images; (b) the learning device performing (i) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (ii) a process of instructing or allowing the auto labeling device to instruct an ROI (region of interest) pooling layer of the auto labeling device to apply at least one pooling operation to each of the second pyramid feature maps for training by using the second bounding boxes for training, to thereby generate each of pooled feature maps for training, and at least one of (ii-1) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii-2) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (iii) one of (iii-1) a process of training the first classifier using one or more second losses calculated by referring to the first class scores for training and ground truths corresponding to the second bounding boxes for training, and (iii-2) a process of training the second classifier using one or more third losses calculated by referring to the second class scores for training and the ground truths corresponding to the second bounding boxes for training.

As one example, at the step of (b), the learning device performs (i) a process of inputting or allowing the auto labeling device to input the pooled feature maps for training into a fitness estimation network of the auto labeling device, to thereby allow the fitness estimation network to apply at least one third fully-connected operation and then at least one sigmoid operation to the pooled feature maps for training and thus to generate fitness values for training which range from 0 to 1, wherein the fitness values for training are created by estimating differences between (1) first uncertainty scores for training in outputs, corresponding to the second unlabeled training images, from the first classifier and (2) second uncertainty scores for training in outputs, corresponding to the second unlabeled training images, from the second classifier, and (ii) a process of inputting or allowing the auto labeling device to input first pooled feature maps for training, among the pooled feature maps for training, into the first classifier, wherein the first pooled feature maps for training correspond to first fitness values for training equal to or greater than a preset criterion fitness value among the fitness values for training, and a process of inputting or allowing the auto labeling device to input second pooled feature maps for training, among the pooled feature maps for training, into the second classifier, wherein the second pooled feature maps for training correspond to second fitness values for training less than the preset criterion fitness value among the fitness values for training, and wherein the learning device performs (i) a process of calculating one or more fourth losses by referring to the first box uncertainty scores for training and adjusted second box uncertainty scores for training, wherein the adjusted second box uncertainty scores for training are created by adjusting each of the second box uncertainty scores for training by a scale parameter such that a range of the adjusted second box uncertainty scores for training corresponds to a range of the first box uncertainty scores for training, (ii) a process of updating the scale parameter by using the fourth losses, and (iii) a process of training the fitness estimation network by referring to the fourth losses.

As one example, the learning device performs a process of clipping the cross entropy losses, created by referring to the fourth losses, if the cross entropy losses lie outside a range from 0 to 1 such that a range of the clipped cross entropy losses becomes a range from 0 to 1, and a process of training the fitness estimation network by using the clipped cross entropy losses.

As one example, at the step of (a), the learning device performs (i) a process of transmitting or allowing the auto labeling device to transmit the first unlabeled training images to at least one third-party object detection network, to thereby allow the third-party object detection network to (1) label the first unlabeled training images, to thereby generate first labeled training images, (2) detect the first objects for training in each of the first labeled training images and thus (3) generate each of first third-party bounding boxes for training corresponding to each of the first objects for training, (ii) a process of selecting first adjusted bounding boxes for training, corresponding to the first objects for training, among a first training box group comprised of the first bounding boxes for training and the first third-party bounding boxes for training, by using an NMS (non-maximal suppression) algorithm, and (iii) a process of setting the first adjusted bounding boxes for training as the first bounding boxes for training, and wherein, at the step of (b), the learning device performs (i) a process of transmitting the second unlabeled training images to the third-party object detection network, to thereby allow the third-party object detection network to (1) label the second unlabeled training images, to thereby generate second labeled training images, (2) detect the second objects for training in each of the second labeled training images and thus (3) generate each of second third-party bounding boxes for training corresponding to each of the second objects for training, (ii) a process of selecting second adjusted bounding boxes for training, corresponding to the second objects for training, among a second training box group comprised of the second bounding boxes for training and the second third-party bounding boxes for training, by using the NMS (non-maximal suppression) algorithm, and (iii) a process of setting the second adjusted bounding boxes for training as the second bounding boxes for training.

As one example, at the step of (b), the learning device performs a process of allowing the first classifier to apply at least one rectifying operation and then the PDF operation to results of the first fully-connected operation, and wherein the rectifying operation converts values of the results such that the values of the results are equal to or greater than 0.

In accordance with another aspect of the present disclosure, there is provided a method for auto labeling while performing automatic verification by using uncertainty scores of auto-labeled labels, including steps of: (a) on condition that a learning device has performed (I) (I-1) a process of inputting or allowing an auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (I-2) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (I-3) a process of training the object detection network and the feature pyramid network, using one or more first losses calculated by referring to the first bounding boxes for training and ground truths of the first unlabeled training images, and (II) (II-1) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (II-2) a process of allowing an ROI (region of interest) pooling layer of the auto labeling device to apply at least one pooling operation to each of the second pyramid feature maps for training by using the second bounding boxes for training, to thereby generate each of pooled feature maps for training, and at least one of (i) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (II-3) one of (i) a process of training the first classifier using one or more second losses calculated by referring to the first class scores for training and ground truths corresponding to the second bounding boxes for training, and (ii) a process of training the second classifier using one or more third losses calculated by referring to the second class scores for training and the ground truths corresponding to the second bounding boxes for training, then if one or more unlabeled test images are acquired, the auto labeling device performing (a1) a process of inputting the unlabeled test images into the feature pyramid network, to thereby allow the feature pyramid network to generate pyramid feature maps for testing with different resolutions, and (a2) a process of inputting the pyramid feature maps for testing into the object detection network, to thereby allow the object detection network to detect one or more objects for testing in each of the pyramid feature maps for testing and thus to generate each of bounding boxes for testing corresponding to each of the objects for testing; (b) the auto labeling device performing (i) a process of allowing the ROI pooling layer to apply the pooling operation to each of the pyramid feature maps for testing by using the bounding boxes for testing, to thereby generate each of pooled feature maps for testing, and (ii) at least one of (ii-1) a process of inputting the pooled feature maps for testing into the first classifier, to thereby allow the first classifier to apply the first fully-connected operation and then the PDF operation to each of the pooled feature maps for testing and thus to generate each of first class scores for testing and each of first box uncertainty scores for testing, respectively corresponding to each of the bounding boxes for testing, and (ii-2) a process of inputting the pooled feature maps for testing into the second classifier, to thereby allow the second classifier to (1) generate k copies of each of the pooled feature maps for testing, (2) randomly set at least one element in each of the k copies of each of the pooled feature maps for testing as 0, to thereby generate randomly-zeroed k copies thereof, (3) apply the second fully-connected operation and then the softmax operation to the randomly-zeroed k copies of each of the pooled feature maps for testing, and thus (4) generate each of second class scores for testing and each of second box uncertainty scores for testing, respectively corresponding to each of the bounding boxes for testing; and (c) the auto labeling device performing (i) a process of generating the bounding boxes for testing, first class information for testing corresponding to the first class scores for testing, and second class information for testing corresponding to the second class scores for testing, for each of the unlabeled test images, to thereby generate labeled images, and (ii) a process of transmitting, to a labeler, specific labeled images, among the generated labeled images, including specific bounding boxes for testing, among the bounding boxes for testing, to thereby allow the labeler to verify the specific labeled images, wherein each of the specific bounding boxes for testing is selected by referring to (1) a first box uncertainty score for testing, among the first box uncertainty scores for testing, equal to or greater than a preset criterion uncertainty score and (2) a second box uncertainty score for testing, among the second box uncertainty scores for testing, equal to or greater than the preset criterion uncertainty score.

As one example, at the step of (b), the auto labeling device performs (i) a process of inputting the pooled feature maps for testing into the fitness estimation network, to thereby allow the fitness estimation network to apply at least one third fully-connected operation and then at least one sigmoid operation to the pooled feature maps for testing and thus to generate fitness values for testing which range from 0 to 1, wherein the fitness values for testing are created by estimating differences between (1) first uncertainty scores for testing in outputs, corresponding to the unlabeled test images, from the first classifier and (2) second uncertainty scores for testing in outputs, corresponding to the unlabeled test images, from the second classifier, and (ii) a process of inputting first pooled feature maps for testing, among the pooled feature maps for testing, into the first classifier, wherein the first pooled feature maps for testing correspond to first fitness values for testing equal to or greater than a preset criterion fitness value among the fitness values for testing, and a process of inputting second pooled feature maps for testing, among the pooled feature maps for testing, into the second classifier, wherein the second pooled feature maps for testing correspond to second fitness values for testing less than the preset criterion fitness value among the fitness values for testing, and wherein the learning device performs a process of setting adjusted second box uncertainty scores for testing as the second box uncertainty scores for testing, and wherein the adjusted second box uncertainty scores for testing are created by adjusting each of the second box uncertainty scores for testing by a scale parameter such that a range of the adjusted second box uncertainty scores for testing corresponds to a range of the first box uncertainty scores for testing.

As one example, at the step of (b), the auto labeling device performs (i) a process of transmitting the unlabeled test images to at least one third-party object detection network, to thereby allow the third-party object detection network to (1) label the unlabeled test images, to thereby generate labeled test images, (2) detect the objects for testing in each of the labeled test images and thus (3) generate each of third-party bounding boxes for testing corresponding to each of the objects for testing, (ii) a process of selecting adjusted bounding boxes for testing, corresponding to the objects for testing, among a test box group comprised of the bounding boxes for testing and the third-party bounding boxes for testing, by using an NMS (non-maximal suppression) algorithm, and (iii) a process of setting the adjusted bounding boxes for testing as the bounding boxes for testing.

As one example, at the step of (b), the auto labeling device performs a process of allowing the first classifier to apply at least one rectifying operation and then the PDF operation to results of the first fully-connected operation, and wherein the rectifying operation converts values of the results such that the values of the results are equal to or greater than 0.

As one example, the method further comprises a step of: (d) the auto labeling device performing a process of re-training at least one of the first classifier, the second classifier, the object detection network, and the feature pyramid network, using one or more fifth losses calculated by referring to the specific labeled images and verified labeled images wherein the verified labeled images are verified by the labeler.

In accordance with still another aspect of the present disclosure, there is provided a learning device for training an auto labeling device capable of performing automatic verification by using uncertainty scores of auto-labeled labels, including: at least one memory that stores instructions; and at least one processor configured to execute the instructions to perform: (I) (i) a process of inputting or allowing the auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (ii) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (iii) a process of training the object detection network and the feature pyramid network, using one or more first losses calculated by referring to the first bounding boxes for training and ground truths of the first unlabeled training images, (II) (i) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (ii) a process of instructing or allowing the auto labeling device to instruct an ROI (region of interest) pooling layer of the auto labeling device to apply at least one pooling operation to each of the second pyramid feature maps for training by using the second bounding boxes for training, to thereby generate each of pooled feature maps for training, and at least one of (ii-1) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii-2) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (iii) one of (iii-1) a process of training the first classifier using one or more second losses calculated by referring to the first class scores for training and ground truths corresponding to the second bounding boxes for training, and (iii-2) a process of training the second classifier using one or more third losses calculated by referring to the second class scores for training and the ground truths corresponding to the second bounding boxes for training.

As one example, at the process of (II), the processor performs (i) a process of inputting or allowing the auto labeling device to input the pooled feature maps for training into a fitness estimation network of the auto labeling device, to thereby allow the fitness estimation network to apply at least one third fully-connected operation and then at least one sigmoid operation to the pooled feature maps for training and thus to generate fitness values for training which range from 0 to 1, wherein the fitness values for training are created by estimating differences between (1) first uncertainty scores for training in outputs, corresponding to the second unlabeled training images, from the first classifier and (2) second uncertainty scores for training in outputs, corresponding to the second unlabeled training images, from the second classifier, and (ii) a process of inputting or allowing the auto labeling device to input first pooled feature maps for training, among the pooled feature maps for training, into the first classifier, wherein the first pooled feature maps for training correspond to first fitness values for training equal to or greater than a preset criterion fitness value among the fitness values for training, and a process of inputting or allowing the auto labeling device to input second pooled feature maps for training, among the pooled feature maps for training, into the second classifier, wherein the second pooled feature maps for training correspond to second fitness values for training less than the preset criterion fitness value among the fitness values for training, and Wherein the processor performs (i) a process of calculating one or more fourth losses by referring to the first box uncertainty scores for training and adjusted second box uncertainty scores for training, wherein the adjusted second box uncertainty scores for training are created by adjusting each of the second box uncertainty scores for training by a scale parameter such that a range of the adjusted second box uncertainty scores for training corresponds to a range of the first box uncertainty scores for training, (ii) a process of updating the scale parameter by using the fourth losses, and (iii) a process of training the fitness estimation network by referring to the fourth losses.

As one example, the processor performs a process of clipping the cross entropy losses, created by referring to the fourth losses, if the cross entropy losses lie outside a range from 0 to 1 such that a range of the clipped cross entropy losses becomes a range from 0 to 1, and a process of training the fitness estimation network by using the clipped cross entropy losses.

As one example, at the process of (I), the processor performs (i) a process of transmitting or allowing the auto labeling device to transmit the first unlabeled training images to at least one third-party object detection network, to thereby allow the third-party object detection network to (1) label the first unlabeled training images, to thereby generate first labeled training images, (2) detect the first objects for training in each of the first labeled training images and thus (3) generate each of first third-party bounding boxes for training corresponding to each of the first objects for training, (ii) a process of selecting first adjusted bounding boxes for training, corresponding to the first objects for training, among a first training box group comprised of the first bounding boxes for training and the first third-party bounding boxes for training, by using an NMS (non-maximal suppression) algorithm, and (iii) a process of setting the first adjusted bounding boxes for training as the first bounding boxes for training, and wherein, at the process of (II), the processor performs (i) a process of transmitting the second unlabeled training images to the third-party object detection network, to thereby allow the third-party object detection network to (1) label the second unlabeled training images, to thereby generate second labeled training images, (2) detect the second objects for training in each of the second labeled training images and thus (3) generate each of second third-party bounding boxes for training corresponding to each of the second objects for training, (ii) a process of selecting second adjusted bounding boxes for training, corresponding to the second objects for training, among a second training box group comprised of the second bounding boxes for training and the second third-party bounding boxes for training, by using the NMS (non-maximal suppression) algorithm, and (iii) a process of setting the second adjusted bounding boxes for training as the second bounding boxes for training.

As one example, at the process of (II), the processor performs a process of allowing the first classifier to apply at least one rectifying operation and then the PDF operation to results of the first fully-connected operation, and wherein the rectifying operation converts values of the results such that the values of the results are equal to or greater than 0.

In accordance with still yet another aspect of the present disclosure, there is provided an auto labeling device for auto labeling while performing automatic verification by using uncertainty scores of auto-labeled labels, including: at least one memory that stores instructions; and at least one processor configured to execute the instructions to perform: (I) on condition that a learning device has performed (I-a) a process of inputting or allowing the auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (I-b) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (I-c) a process of training the object detection network and the feature pyramid network, using one or more first losses calculated by referring to the first bounding boxes for training and ground truths of the first unlabeled training images, (I-d) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (I-e) a process of allowing an ROI (region of interest) pooling layer of the auto labeling device to apply at least one pooling operation to each of the second pyramid feature maps for training by using the second bounding boxes for training, to thereby generate each of pooled feature maps for training, and at least one of (i) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (I-f) one of (1) a process of training the first classifier using one or more second losses calculated by referring to the first class scores for training and ground truths corresponding to the second bounding boxes for training, and (2) a process of training the second classifier using one or more third losses calculated by referring to the second class scores for training and the ground truths corresponding to the second bounding boxes for training, then if one or more unlabeled test images are acquired, (I-1) a process of inputting the unlabeled test images into the feature pyramid network, to thereby allow the feature pyramid network to generate pyramid feature maps for testing with different resolutions, and (I-2) a process of inputting the pyramid feature maps for testing into the object detection network, to thereby allow the object detection network to detect one or more objects for testing in each of the pyramid feature maps for testing and thus to generate each of bounding boxes for testing corresponding to each of the objects for testing, (II) (i) a process of allowing the ROI pooling layer to apply the pooling operation to each of the pyramid feature maps for testing by using the bounding boxes for testing, to thereby generate each of pooled feature maps for testing, and (ii) at least one of (ii-1)

a process of inputting the pooled feature maps for testing into the first classifier, to thereby allow the first classifier to apply the first fully-connected operation and then the PDF operation to each of the pooled feature maps for testing and thus to generate each of first class scores for testing and each of first box uncertainty scores for testing, respectively corresponding to each of the bounding boxes for testing, and (ii-2) a process of inputting the pooled feature maps for testing into the second classifier, to thereby allow the second classifier to (1) generate k copies of each of the pooled feature maps for testing, (2) randomly set at least one element in each of the k copies of each of the pooled feature maps for testing as 0, to thereby generate randomly-zeroed k copies thereof, (3) apply the second fully-connected operation and then the softmax operation to the randomly-zeroed k copies of each of the pooled feature maps for testing, and thus (4) generate each of second class scores for testing and each of second box uncertainty scores for testing, respectively corresponding to each of the bounding boxes for testing, and (III) (i) a process of generating the bounding boxes for testing, first class information for testing corresponding to the first class scores for testing, and second class information for testing corresponding to the second class scores for testing, for each of the unlabeled test images, to thereby generate labeled images, and (ii) a process of transmitting, to a labeler, specific labeled images, among the generated labeled images, including specific bounding boxes for testing, among the bounding boxes for testing, to thereby allow the labeler to verify the specific labeled images, wherein each of the specific bounding boxes for testing is selected by referring to (1) a first box uncertainty score for testing, among the first box uncertainty scores for testing, equal to or greater than a preset criterion uncertainty score and (2) a second box uncertainty score for testing, among the second box uncertainty scores for testing, equal to or greater than the preset criterion uncertainty score.

As one example, at the process of (II), the processor performs (i) a process of inputting the pooled feature maps for testing into the fitness estimation network, to thereby allow the fitness estimation network to apply at least one third fully-connected operation and then at least one sigmoid operation to the pooled feature maps for testing and thus to generate fitness values for testing which range from 0 to 1, wherein the fitness values for testing are created by estimating differences between (1) first uncertainty scores for testing in outputs, corresponding to the unlabeled test images, from the first classifier and (2) second uncertainty scores for testing in outputs, corresponding to the unlabeled test images, from the second classifier, and (ii) a process of inputting first pooled feature maps for testing, among the pooled feature maps for testing, into the first classifier, wherein the first pooled feature maps for testing correspond to first fitness values for testing equal to or greater than a preset criterion fitness value among the fitness values for testing, and a process of inputting second pooled feature maps for testing, among the pooled feature maps for testing, into the second classifier, wherein the second pooled feature maps for testing correspond to second fitness values for testing less than the preset criterion fitness value among the fitness values for testing, and wherein the learning device performs a process of setting adjusted second box uncertainty scores for testing as the second box uncertainty scores for testing, and wherein the adjusted second box uncertainty scores for testing are created by adjusting each of the second box uncertainty scores for testing by a scale parameter such that a range of the adjusted second box uncertainty scores for testing corresponds to a range of the first box uncertainty scores for testing.

As one example, at the process of (II), the processor performs (i) a process of transmitting the unlabeled test images to at least one third-party object detection network, to thereby allow the third-party object detection network to (1) label the unlabeled test images, to thereby generate labeled test images, (2) detect the objects for testing in each of the labeled test images and thus (3) generate each of third-party bounding boxes for testing corresponding to each of the objects for testing, (ii) a process of selecting adjusted bounding boxes for testing, corresponding to the objects for testing, among a test box group comprised of the bounding boxes for testing and the third-party bounding boxes for testing, by using an NMS (non-maximal suppression) algorithm, and (iii) a process of setting the adjusted bounding boxes for testing as the bounding boxes for testing.

As one example, at the process of (II), the processor performs a process of allowing the first classifier to apply at least one rectifying operation and then the PDF operation to results of the first fully-connected operation, and wherein the rectifying operation converts values of the results such that the values of the results are equal to or greater than 0.

As one example, the processor further performs: (IV) a process of re-training at least one of the first classifier, the second classifier, the object detection network, and the feature pyramid network, using one or more fifth losses calculated by referring to the specific labeled images and verified labeled images wherein the verified labeled images are verified by the labeler.

In addition, recordable media that are readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 7 is a drawing schematically illustrating processes of selectively using the first classifier and the second classifier by using the fitness value of an unlabeled test image in accordance with one example of the present disclosure.

DETAILED DESCRIPTION OF THE PREFERRED EMBODIMENTS

Figure 1:
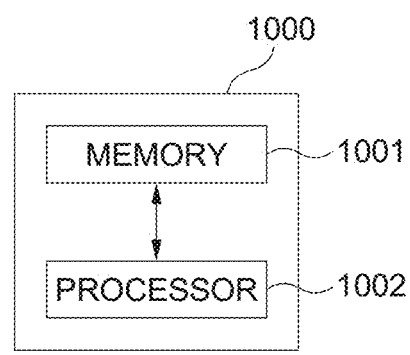
FIG. 1 is a drawing schematically illustrating a learning device for training an auto labeling device which performs automatic verification by using uncertainty scores of auto-labeled labels in accordance with one example of the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

For reference, throughout the present disclosure, the phrase "for training" or "training" is added to terms related to training processes, and the phrase "for testing", "testing", or "test" is added to terms related to testing processes, to avoid possible confusion.

To allow those skilled in the art to carry out the present disclosure easily, the example embodiments of the present disclosure will be explained by referring to attached diagrams in detail as shown below.

FIG. 1 is a drawing schematically illustrating a learning device for training an auto labeling device which performs automatic verification by using uncertainty scores of auto-labeled labels in accordance with one example of the present disclosure. By referring to FIG. 1, the learning device 1000 may include a memory 1001 for storing instructions to train the auto labeling device which performs the automatic verification by using the uncertainty scores of the auto-labeled labels and a processor 1002 for performing processes of training the auto labeling device according to the instructions in the memory 1001.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS (operating system) and software configuration of applications that achieve specific purposes.

Such description of the computing device does not exclude an integrated device including any combination of a processor, a memory, a medium, or any other computing components for implementing the present disclosure.

Figure 2:
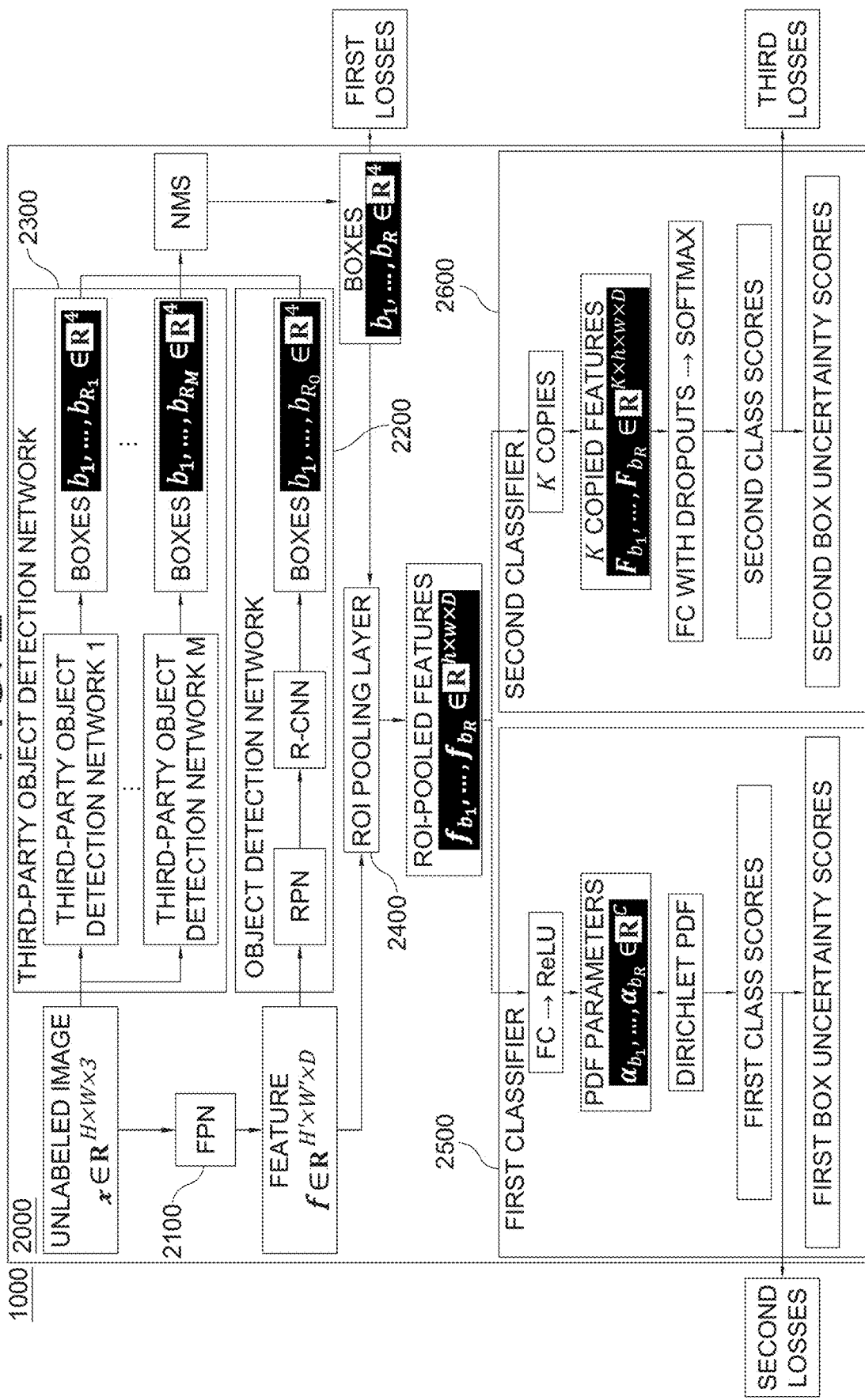
FIG. 2 is a drawing schematically illustrating a method for training the auto labeling device which performs the automatic verification by using the uncertainty scores of the auto-labeled labels in accordance with one example of the present disclosure.

A method of the learning device 1000 for training the auto labeling device 2000 which performs the automatic verification by using the uncertainty scores of the auto-labeled labels in accordance with one example embodiment of the present disclosure is described by referring to FIG. 2 as follows. In FIG. 2, terminologies of inputs and outputs may vary according to attributes of the unlabeled image. For example, "first", "second", "test" and the like may be attached to various inputs and outputs.

First, if one or more first unlabeled training images are acquired, the learning device 1000 may perform a process of inputting or allowing the auto labeling device 2000 to input the first unlabeled training images into a feature pyramid network (FPN) 2100 of the auto labeling device 2000.

Then the feature pyramid network 2100 may apply at least one convolution operation to each of the first unlabeled training images and thus generate one or more first pyramid feature maps for training with different resolutions for each of the first unlabeled training images. That is, supposing that a size of the first unlabeled training images is H×W, sizes of the first pyramid feature maps for training generated by the feature pyramid network 2100 may be H'×W'.

Thereafter, the learning device 1000 may perform a process of inputting or allowing the auto labeling device 2000 to input the first pyramid feature maps for training into the object detection network 2200 of the auto labeling device 2000.

Then the object detection network 2200 may detect one or more first objects for training in each of the first pyramid feature maps for training and thus generate each of first bounding boxes for training corresponding to each of the first objects for training.

Herein, the object detection network 2200 may (i) allow a region proposal network (RPN) to generate one or more first proposal boxes for training, where the first objects for training are estimated as located, on the first pyramid feature maps for training, (ii) apply at least one pooling operation to the first pyramid feature maps for training by using the first proposal boxes for training, and (iii) allow an R-CNN (region based convolutional neural network) to apply at least one fully-connected operation to the pooled first pyramid feature maps for training, to thereby generate each of the first bounding boxes for training corresponding to each of the first objects for training. However, the object detection network 2200 in accordance with the present disclosure is not limited to be configured as R-CNN. For example, the object detection network 2200 may be configured as any perception networks capable of detecting objects on images, such as CNN, Fast R-CNN, YOLO (you only look once), SSD (single shot detector), etc.

Meanwhile, the first objects for training are described above as detected by using only the object detection network 2200 of the auto labeling device 2000, but as another example, at least one third-party object detection network capable of providing an object detection service may further be used for detecting the first objects for training.

That is, the learning device 1000 may perform a process of transmitting or allowing the auto labeling device 2000 to transmit the first unlabeled training images to the third-party object detection network 2300. Then the third-party object detection network 2300 may perform (1) labeling on the first unlabeled training images, to thereby generate first labeled training images, (2) detecting the first objects for training in each of the first labeled training images and thus (3) generating each of first third-party bounding boxes for training corresponding to each of the first objects for training. Thereafter, the learning device 1000 may perform or allow the auto labeling device 2000 to perform (i) a process of selecting first adjusted bounding boxes for training, corresponding to the first objects for training, among a first training box group comprised of the first bounding boxes for training and the first third-party bounding boxes for training, by using an NMS (non-maximal suppression) algorithm, and (ii) a process of setting the first adjusted bounding boxes for training as the first bounding boxes for training.

Thereafter, the learning device 1000 may perform a process of training the object detection network 2200 and the feature pyramid network 2100, using one or more first losses calculated by referring to the first bounding boxes for training and ground truths of the first unlabeled training images.

Next, on condition that the object detection network 2200 and the feature pyramid network 2100 have been trained, the learning device 1000 may perform a process of inputting or allowing the auto labeling device 2000 to input the second unlabeled training images into the feature pyramid network 2100 of the auto labeling device 2000.

Then the feature pyramid network 2100 may apply the convolution operation to each of the second unlabeled training images and thus generate one or more second pyramid feature maps for training with different resolutions for each of the second unlabeled training images.

Thereafter, the learning device 1000 may perform a process of inputting or allowing the auto labeling device 2000 to input the second pyramid feature maps for training into the object detection network 2200.

Then the object detection network 2200 may detect one or more second objects for training in each of the second pyramid feature maps for training and thus generate each of second bounding boxes for training corresponding to each of the second objects for training.

Herein, the object detection network 2200 may (i) allow the region proposal network to generate one or more second proposal boxes for training, where the second objects for training are estimated as located, on the second pyramid feature maps for training, (ii) apply the pooling operation to the second pyramid feature maps for training by using the second proposal boxes for training, and (iii) allow the R-CNN to apply the fully-connected operation to the pooled second pyramid feature maps for training, to thereby generate each of the second bounding boxes for training corresponding to each of the second objects for training.

Meanwhile, the second objects for training are shown above as detected by using only the object detection network 2200 of the auto labeling device 2000, but as another example, at least one third-party object detection network providing the object detection service may further be used for detecting the second objects for training.

That is, the learning device 1000 may perform a process of transmitting or allowing the auto labeling device 2000 to transmit the second unlabeled training images to the third-party object detection network 2300. Then the third-party object detection network 2300 may perform (1) labeling on the second unlabeled training images, to thereby generate second labeled training images, (2) detecting the second objects for training in each of the second labeled training images and thus (3) generating each of second third-party bounding boxes for training corresponding to each of the second objects for training. Thereafter, the learning device 1000 may perform or allow the auto labeling device 2000 to perform (i) a process of selecting second adjusted bounding boxes for training, corresponding to the second objects for training, among a second training box group comprised of the second bounding boxes for training and the second third-party bounding boxes for training, by using the NMS algorithm, and (ii) a process of setting the second adjusted bounding boxes for training as the second bounding boxes for training.

Next, the learning device 1000 may perform or support the auto labeling device 2000 to perform a process of allowing an ROI (region of interest) pooling layer 2400 of the auto labeling device 2000 to apply the pooling operation to each of the second pyramid feature maps for training by using the second bounding boxes for training, to thereby generate each of pooled feature maps for training.

Next, the learning device 1000 may perform at least one of (i) a process of inputting or allowing the auto labeling device 2000 to input the pooled feature maps for training into a first classifier 2500 of the auto labeling device 2000, to thereby allow the first classifier 2500 to generate each of first class scores for training and each of first box uncertainty scores for training, respectively corresponding to each of the second bounding boxes for training, and (ii) a process of inputting or allowing the auto labeling device 2000 to input the pooled feature maps for training into a second classifier 2600 of the auto labeling device 2000, to thereby allow the second classifier 2600 to generate each of second class scores for training and each of second box uncertainty scores for training, respectively corresponding to each of the second bounding boxes for training.

Next, the learning device 1000 may perform one of (i) a process of training the first classifier 2500 using one or more second losses calculated by referring to the first class scores for training and ground truths corresponding to the second bounding boxes for training, and (ii) a process of training the second classifier 2600 using one or more third losses calculated by referring to the second class scores for training and the ground truths corresponding to the second bounding boxes for training.

Herein, processes of generating the first class scores for training, the first box uncertainty scores for training, the second class scores for training, and the second box uncertainty scores for training, by the first classifier 2500 and the second classifier 2600 are described in detail as follows.

First, the first classifier 2500 may apply at least one first fully-connected operation and then at least one PDF (probability distribution function) operation to each of the pooled feature maps for training and thus generate each of the first class scores for training and each of the first box uncertainty scores for training, respectively corresponding to each of the second bounding boxes for training.

That is, the first classifier 2500 may input each of the pooled feature maps for training into an FC (fully connected) network, to thereby allow the FC network to apply the fully-connected operation to each of the pooled feature maps for training and thus to output PDF parameters.

As one example, supposing that the first class scores for training $y=[y_1, y_2, \ldots, y_c]$ to be used for determining c classes follow a Dirichlet distribution as shown in an equation 1 as below, the PDF parameters may be $\alpha_1, \alpha_2, \ldots,$ and $\alpha_c$.

$$p(y \mid \alpha) = \frac{\Gamma\left(\sum_{j=1}^{C} \alpha_j\right)}{\prod_{j=1}^{C} \Gamma(\alpha_j)} \sum_{j=1}^{C} y_j^{\alpha_j - 1}, \alpha_j \geq 0 \qquad < \text{Equation 1} >$$

In the equation 1, $\Gamma$ may represent a gamma function.

And, in order to satisfy a condition $\alpha_j \geq 0$, at least one rectifying operation may be applied to results of the first fully-connected operation such that values of the results are equal to or greater than 0. Herein, a ReLU (Rectified Linear Unit) layer may be used for the rectifying operation, and the ReLU layer may leave an element, equal to or larger than 0, of an input tensor as is, but may convert an element, less than 0, of the input tensor into 0.

Also, since the first class scores for training, i.e., y, are defined probabilistically, expected losses may be used as the second losses which are related to y.

As one example, if y follows the Dirichlet distribution, and if losses related to y are defined as cross entropy losses, then the expected losses may be calculated by an equation 2.

$$E[L(y \mid y^*)] = \qquad < \text{Equation 2} >$$
$$\int \left[ \sum_{j=1}^{C} -y_j^* \log(y_j) \right] p(y) dy = \sum_{j=1}^{C} y_j^* (\psi(S) - \psi(\alpha_j))$$

In the equation 2, y* represents a ground truth, $\psi$ represents a Digamma function, S represents a sum of the PDF parameters which may be calculated as $$S = \sum_{j=1}^{C} \alpha_j.$$

Therefore, the learning device 1000 may perform a process of training the first classifier 2500 via backpropagating gradients corresponding to the expected losses as shown in the equation 2.

And, a mean and a variance of the Dirichlet distribution may be calculated as shown in an equation 3 below.

$$E[y_j] = \frac{\alpha_j}{S} \qquad < \text{Equation 3} >$$
$$\text{Var}[y_j] = \frac{\alpha_j(S - \alpha_j)}{S^2(S+1)}$$

In the equation 3, S may be the sum of the PDF parameters and may be calculated as $$S = \sum_{j=1}^{C} \alpha_j.$$

Also, the first box uncertainty scores for training may be calculated as shown in an equation 4 below.

$$UncertaintyScore(y \mid \alpha) = \frac{C}{C + S} \qquad < \text{Equation 4} >$$

The uncertainty score in the equation 4 may be derived by formularizing a theory on the uncertainty called Dempster-Shafer theory of evidence (or belief theory) described in "Interpreting Belief Functions as Dirichlet Distributions" (Auden Josang et al.) using the Dirichlet distribution.

And, according to the equation 4, the sum of the PDF parameters is small in a case of a high uncertainty score.

For example, supposing that $\alpha_1=[0.1, 0.01, 0]$ ($S_1=0.11$) and, $\alpha_2=[10, 1, 0]$ ($S_2=11$), then, as shown in an equation 5, the means are identical but the uncertainty scores much differ.

$$E[y_1] = \frac{\alpha_1}{S_1} = E[y_2] = \frac{\alpha_2}{S_2} = [0.91, 0.09, 0] \qquad < \text{Equation 5} >$$
$$U(y_1 \mid \alpha_1) = \frac{3}{3 + 0.11} = 0.96$$
$$U(y_2 \mid \alpha_2) = \frac{3}{3 + 11} = 0.21$$

Figure 3:
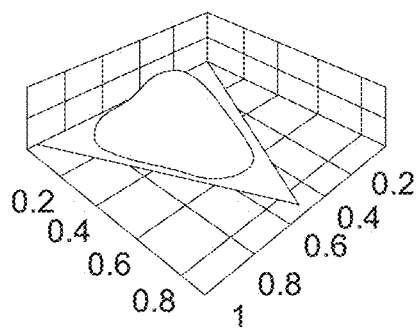
FIG. 3 is a drawing schematically illustrating exemplar distributions of outputs from a first classifier in accordance with one example of the present disclosure.
Figure 3:
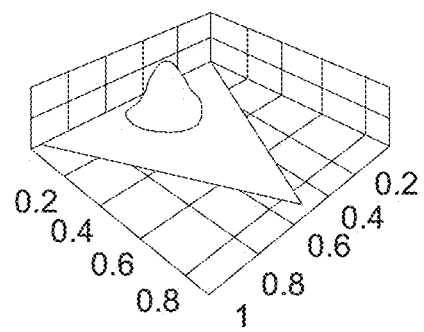

That is, comparing distributions of $p(y_1|\alpha_1)$ and $p(y_2|\alpha_2)$ by referring to FIG. 3, locations of the means are identical for $\alpha_1$ and $\alpha_2$, however, the distribution of $p(y_1|\alpha_1)$ is much broader. Herein, the broad distribution of $p(y_1|\alpha_1)$ represents that $p(y_1|\alpha_1)$ is more difficult to predict precisely, and this can be interpreted that input data are near an area difficult to classify, that is, near a decision boundary.

Therefore, a shape of the distribution of the first class scores for training may vary according to the PDF parameters, and the uncertainty score of the inputted image may be measured with a single inference by training for minimizing the expected losses, as can be seen by referring to "Evidential Deep Learning to Quantify Classification Uncertainty" (Murat Sensoy et al.).

Especially, since the Dirichlet distribution is a probability distribution of non-negative vectors whose sum of elements is 1, in case of softmax vectors such as class scores, an assumption that most of them follow the Dirichlet distribution is justified. Also, in the case of the Dirichlet distribution, since there is an equation for calculating the uncertainty score ranging a from 0 to 1 as well as the variance, a reliability of prediction is easy to measure if the Dirichlet distribution is adopted for a classification network.

Next, the second classifier 2600 may (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training.

Herein, each of the second class scores for training to be used for determining the c classes may be a c-dimensional softmax vector where $y_i=[y_{i1}, y_{i2}, \ldots, y_{iC}]$. Herein, $y_{i1}+y_{i2}+\ldots+y_{iC}=1$.

And, various values, such as a variance of the second class scores for training, entropy of the second class scores for training, etc. may be used as the first box uncertainty scores for training. Also, it is known that a measure called BALD (Bayesian Active Learning by Disagreement) is effective for representing the uncertainty. By referring to "Bayesian Active Learning for Classification and Preference Learning" (Neil Houlsby et al.), the BALD may be calculated as shown in an equation 6.

$$UncertaintyScore(y) = \text{Entropy}\left(\frac{y_1 + y_2 + \ldots + y_K}{K}\right) - \frac{1}{K}\sum_{i=1}^{K} \text{Entropy}(y_i) \qquad <\text{Equation 6}>$$

According to the equation 6, high uncertainty scores are generated when each of $y_i$ predicts different classes with high confidence scores.

For example, given that $y_1=[0.9, 0.1, 0]$, $y_2=[0.01, 0.99, 0]$, $y_3=[0, 0, 1]$, and $y_4=[0, 0, 1]$, since each of $y_i$ is a one-hot vector or almost similar thereto, each Entropy$(y_i)$, i.e., 0.33, 0.06, 0, and 0, is much small. However, since each of $y_i$ predicts different classes, an average $$\frac{y_1 + y_2 + \ldots + y_K}{K}$$

of $y_i$ is [0.23, 0.27, 0.5], similar to uniformity, and the entropy, calculated as 1.04, of the average is large. Accordingly, since the first term of the equation 6 is large and the second term thereof is small, the uncertainty score is large.

Therefore, since the second classifier 2600 performs multiple inferences for a single input, an accuracy of the class scores is improved.

Figure 4:
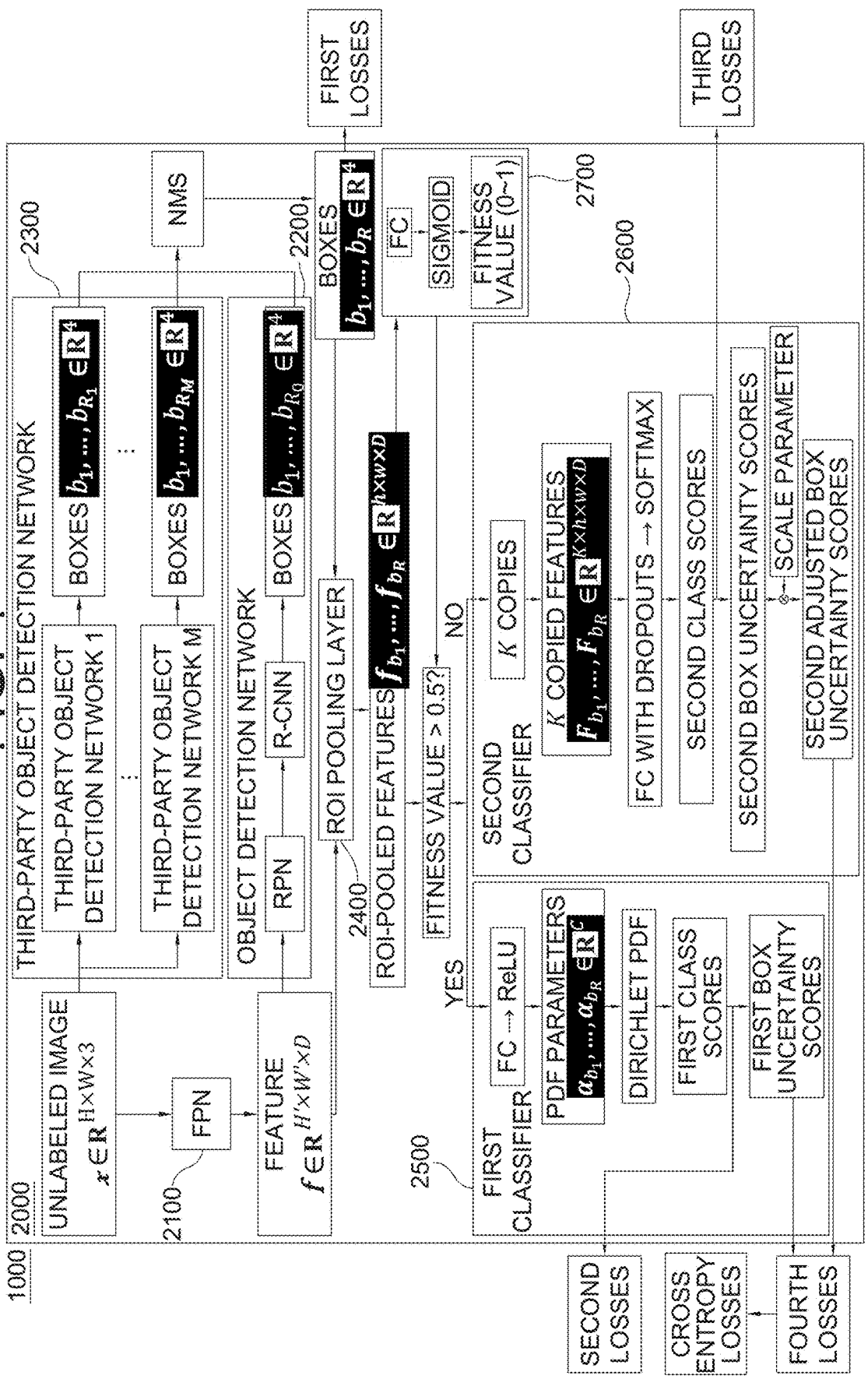
FIG. 4 is a drawing schematically illustrating processes of selectively using the first classifier and a second classifier by using a fitness value of an unlabeled training image in accordance with one example of the present disclosure.

FIG. 4 is a drawing schematically illustrating a process of selectively using the first classifier and a second classifier by using a fitness value of an unlabeled training image in accordance with one example of the present disclosure, and its description is as follows. In the description below, the part easily deducible from the explanation of FIG. 2 will be omitted.

First, on condition that the feature pyramid network 2100 and the object detection network 2200 of the auto labeling device 2000 have been trained by using the first unlabeled training images, the learning device 1000 may perform a process of inputting or allowing the auto labeling device 2000 to input the second unlabeled training images into the feature pyramid network 2100 of the auto labeling device 2000.

Then the feature pyramid network 2100 may apply the convolution operation to each of the second unlabeled training images and thus generate one or more second pyramid feature maps for training with different resolutions for each of the second unlabeled training images.

Thereafter, the learning device 1000 may perform a process of inputting or allowing the auto labeling device 2000 to input the second pyramid feature maps for training into the object detection network 2200.

Then the object detection network 2200 may detect one or more second objects for training in each of the second pyramid feature maps for training and thus generate each of second bounding boxes for training corresponding to each of the second objects for training.

Meanwhile, the second objects for training are shown above as detected by using only the object detection network 2200 of the auto labeling device 2000, but as another example, at least one third-party object detection network providing the object detection service may further be used for detecting the second objects for training.

That is, the learning device 1000 may perform a process of transmitting or allowing the auto labeling device 2000 to transmit the second unlabeled training images to the third-party object detection network 2300. Then the third-party object detection network 2300 may perform (1) labeling on the second unlabeled training images, to thereby generate second labeled training images, (2) detecting the second objects for training in each of the second labeled training images and thus (3) generating each of second third-party bounding boxes for training corresponding to each of the second objects for training. Thereafter, the learning device 1000 may perform or allow the auto labeling device 2000 to perform (i) a process of selecting second adjusted bounding boxes for training, corresponding to the second objects for training, among a second training box group comprised of the second bounding boxes for training and the second third-party bounding boxes for training, by using the NMS algorithm, and (ii) a process of setting the second adjusted bounding boxes for training as the second bounding boxes for training.

Next, the learning device 1000 may perform or support the auto labeling device 2000 to perform a process of allowing an ROI (region of interest) pooling layer 2400 of the auto labeling device to apply the pooling operation to each of the second pyramid feature maps for training by using the second bounding boxes for training, to thereby generate each of pooled feature maps for training.

Next, the learning device 1000 may perform a process of inputting or allowing the auto labeling device 2000 to input the pooled feature maps for training into a fitness estimation network 2700 of the auto labeling device 2000.

Then, the fitness estimation network 2700 may apply at least one third fully-connected operation and then at least one sigmoid operation to the pooled feature maps for training and thus generate fitness values for training which range from 0 to 1.

Herein, the fitness values for training may be created by estimating differences between (1) first box uncertainty scores for training of the first class scores for training, corresponding to the second unlabeled training images, outputted from the first classifier 2500 and (2) second box uncertainty scores for training of the second class scores for training, corresponding to the second unlabeled training images, outputted from the second classifier 2600.

And, the learning device 1000 may perform or support the auto labeling device 2000 to perform a process of confirming the fitness values for training.

Herein, first pooled feature maps for training, among the pooled feature maps for training, may be inputted into the first classifier 2500, where the first pooled feature maps for training correspond to first fitness values for training equal to or greater than a preset criterion fitness value among the fitness values for training, and as described by referring to FIG. 2, the first classifier 2500 may generate each of the first class scores for training and each of the first box uncertainty scores for training, respectively corresponding to each of the second bounding boxes for training.

And, second pooled feature maps for training, among the pooled feature maps for training, may be inputted into the second classifier 2600, where the second pooled feature maps for training correspond to second fitness values for training less than the preset criterion fitness value among the fitness values for training, and as described by referring to FIG. 2, the second classifier 2600 may generate each of second class scores for training and each of the second box uncertainty scores for training, respectively corresponding to each of the second bounding boxes for training.

Next, the learning device 1000 may perform one of (i) a process of training the first classifier 2500 using one or more second losses calculated by referring to the first class scores for training and ground truths corresponding to the second bounding boxes for training, and (ii) a process of training the second classifier 2600 using one or more third losses calculated by referring to the second class scores for training and the ground truths corresponding to the second bounding boxes for training.

Next, the learning device may perform a process of calculating one or more fourth losses by referring to the first box uncertainty scores for training and adjusted second box uncertainty scores for training, where the adjusted second box uncertainty scores for training may be created by adjusting each of the second box uncertainty scores for training by a scale parameter such that a range of the adjusted second box uncertainty scores for training corresponds to a range of the first box uncertainty scores for training.

Thereafter, the learning device 1000 may perform a process of updating the scale parameter by using the fourth losses, and a process of training the fitness estimation network 2700 by referring to the fourth losses. For example, the process of training the fitness estimation network 2700 may be performed by using cross entropy losses. Herein, the cross entropy losses may be defined as "1−|first box uncertainty scores for training−adjusted second box uncertainty scores for training|", but the scope of the present disclosure is not limited thereto. Herein, if the cross entropy losses lie outside a range from 0 to 1, then the cross entropy losses may be clipped such that a range of the clipped cross entropy losses becomes a range from 0 to 1. And the fitness estimation network 2700 may be trained by using the clipped cross entropy losses.

That is, the learning device 1000 may perform a process of training the fitness estimation network 2700 such that the fitness values for training are inversely proportional to differences between the first box uncertainty scores for training and the adjusted second box uncertainty scores for training.

Therefore, depending on whether the class scores follow a specific distribution or not, either the first classifier or the second classifier may be selected to label the class scores of the objects for training in the training images in accordance with the present disclosure, and both the accuracy and the cost-effectiveness are satisfied.

Figure 5:
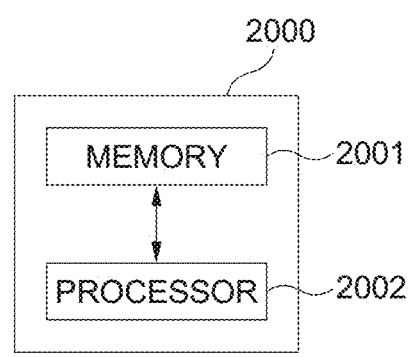
FIG. 5 is a drawing schematically illustrating the auto labeling device which performs the automatic verification by using the uncertainty scores of the auto-labeled labels in accordance with one example of the present disclosure.

FIG. 5 is a drawing schematically illustrating the auto labeling device which performs the automatic verification by using the uncertainty scores of the auto-labeled labels in accordance with one example of the present disclosure. By referring to FIG. 5, the auto labeling device 2000 may include a memory 2001 for storing instructions to perform auto labeling where the automatic verification by using the uncertainty scores of the auto-labeled labels is performed and a processor 2002 for performing processes of performing the auto labeling according to the instructions in the memory 2001.

Specifically, the auto labeling device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS (operating system) and software configuration of applications that achieve specific purposes.

Such description of the computing device does not exclude an integrated device including any combination of a processor, a memory, a medium, or any other computing components for implementing the present disclosure.

Figure 6:
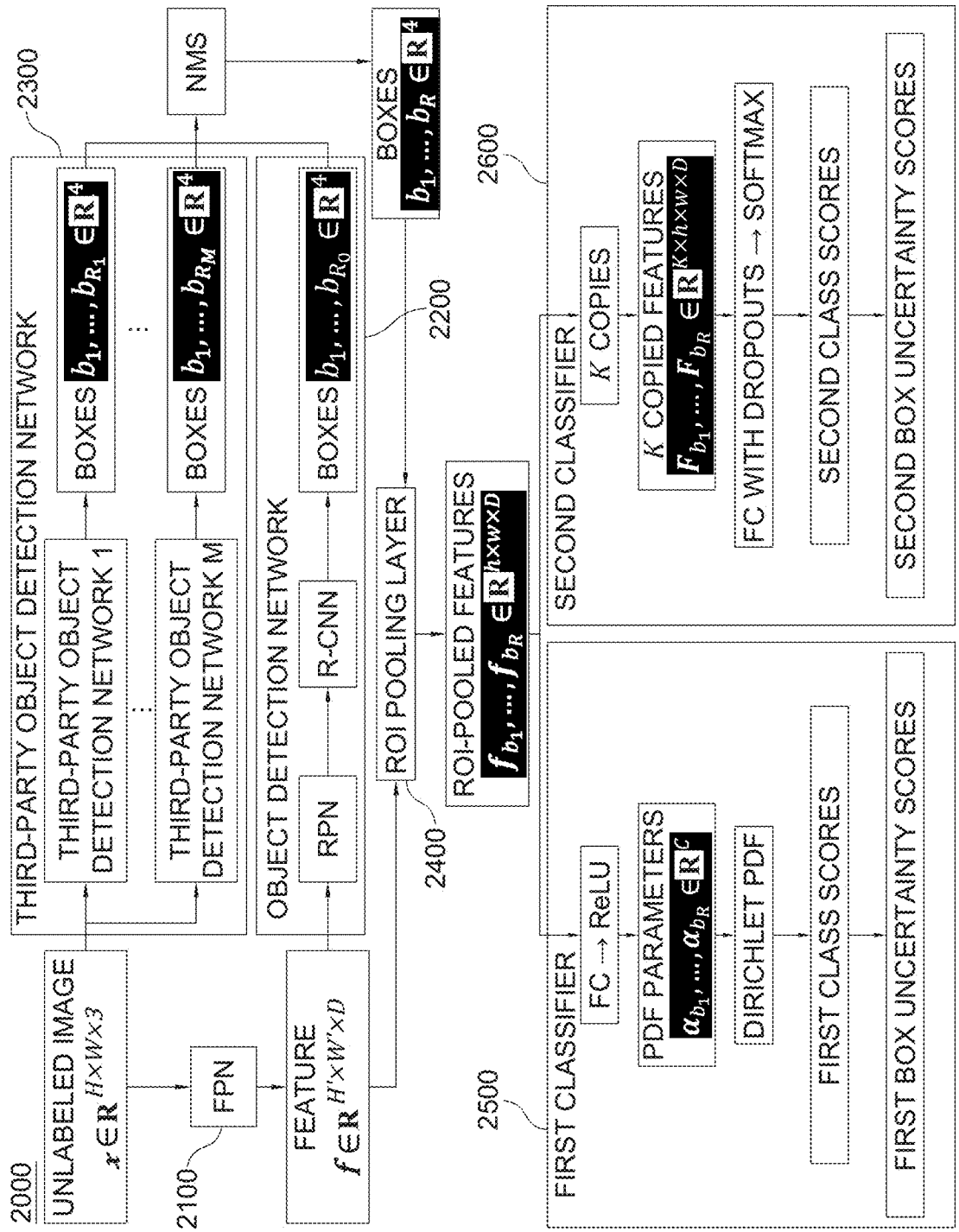
FIG. 6 is a drawing schematically illustrating a method for auto labeling which performs the automatic verification by using the uncertainty scores of the auto-labeled labels in accordance with one example of the present disclosure.

A method of the auto labeling device 2000 for the auto labeling performing the automatic verification by using the uncertainty scores of the auto-labeled labels in accordance with one example embodiment of the present disclosure is described by referring to FIG. 6 as follows. In the description below, the part easily deducible from the description of FIGS. 2 to 4 will be omitted.

First, on condition that the auto labeling device 2000 has been trained according to the description of FIGS. 2 to 4, if one or more unlabeled test images are acquired, the auto labeling device 2000 may perform a process of inputting the unlabeled test images into the feature pyramid network 2100.

Then the feature pyramid network 2100 may apply the convolution operation to each of the unlabeled test images and thus generate one or more pyramid feature maps for testing with different resolutions for each of the unlabeled test images.

Thereafter, the auto labeling device 2000 may input the pyramid feature maps for testing into the object detection network 2200.

Then the object detection network 2200 may detect one or more objects for testing in each of the pyramid feature maps for testing and thus generate each of bounding boxes for testing corresponding to each of the objects for testing.

Herein, the object detection network 2200 may (i) allow the region proposal network to generate one or more proposal boxes for testing, where the objects for testing are estimated as located, on the pyramid feature maps for testing, (ii) apply the pooling operation to the pyramid feature maps for testing by using the proposal boxes for testing, and (iii) allow the R-CNN to apply the fully-connected operation to the pooled pyramid feature maps for testing, to thereby generate each of the bounding boxes for testing corresponding to each of the objects for testing.

Meanwhile, the objects for testing are shown above as detected by using only the object detection network 2200 of the auto labeling device 2000, but as another example, at least one third-party object detection network providing the object detection service may further be used for detecting the objects for testing.

That is, the auto labeling device 2000 may transmit the unlabeled test images to the third-party object detection network 2300. Then the third-party object detection network 2300 may perform (1) labeling on the unlabeled test images, to thereby generate labeled test images, (2) detecting the objects for testing in each of the labeled test images and thus (3) generating each of third-party bounding boxes for testing corresponding to each of the objects for testing. Thereafter, the auto labeling device 2000 may perform (i) a process of selecting adjusted bounding boxes for testing, corresponding to the objects for testing, among a test box group comprised of the bounding boxes for testing and the third-party bounding boxes for testing, by using the NMS algorithm, and (ii) a process of setting the adjusted bounding boxes for testing as the bounding boxes for testing.

Next, the auto labeling device 2000 may perform a process of allowing the ROI pooling layer 2400 to apply the pooling operation to each of the pyramid feature maps for testing by using the bounding boxes for testing, to thereby generate each of pooled feature maps for testing.

Next, the auto labeling device 2000 may perform at least one of (i) a process of inputting the pooled feature maps for testing into the first classifier 2500, to thereby allow the first classifier 2500 to generate each of first class scores for testing and each of first box uncertainty scores for testing, respectively corresponding to each of the bounding boxes for testing, and (ii) a process of inputting the pooled feature maps for testing into the second classifier 2600, to thereby allow the second classifier 2600 to generate each of second class scores for testing and each of second box uncertainty scores for testing, respectively corresponding to each of the bounding boxes for testing.

Next, the auto labeling device 2000 may perform a process of generating the bounding boxes for testing, first class information for testing corresponding to the first class scores for testing, and second class information for testing corresponding to the second class scores for testing, for each of the unlabeled test images, to thereby generate labeled images.

And the auto labeling device 2000 may perform a process of transmitting, to a labeler, specific labeled images, among the generated labeled images, including specific bounding boxes for testing, among the bounding boxes for testing, to thereby allow the labeler to verify the specific labeled images, where each of the specific bounding boxes for testing is selected by referring to (1) a first box uncertainty score for testing, among the first box uncertainty scores for testing, equal to or greater than a preset criterion uncertainty score and (2) a second box uncertainty score for testing, among the second box uncertainty scores for testing, equal to or greater than the preset criterion uncertainty score. Herein, the labeler may be a human, but the scope of the present disclosure is not limited thereto.

Further, the auto labeling device 2000 may perform a process of re-training at least one of the first classifier, the second classifier, the object detection network, and the feature pyramid network, using one or more fifth losses calculated by referring to the specific labeled images and verified labeled images where the verified labeled images are verified by the labeler.

FIG. 7 is a drawing schematically illustrating a process of selectively using the first classifier and the second classifier by using the fitness value of an unlabeled test image in accordance with one example of the present disclosure, and its description is as follows. In the description below, the part easily deducible from the description of FIGS. 2 to 6 will be omitted.

First, the auto labeling device 2000 may input the unlabeled test images into the feature pyramid network 2100.

Then the feature pyramid network 2100 may apply the convolution operation to each of the unlabeled test images and thus generate one or more pyramid feature maps for testing with different resolutions for each of the unlabeled test images.

Thereafter, the auto labeling device 2000 may input the pyramid feature maps for testing into the object detection network 2200.

Then the object detection network 2200 may detect one or more objects for testing in each of the pyramid feature maps for testing and thus generate each of bounding boxes for testing corresponding to each of the objects for testing.

Meanwhile, the objects for testing are shown above as detected by using only the object detection network 2200 of the auto labeling device 2000, but as another example, at least one third-party object detection network providing the object detection service may further be used for detecting the objects for testing.

That is, the auto labeling device 2000 may transmit the unlabeled test images to the third-party object detection network 2300. Then the third-party object detection network 2300 may perform (1) labeling on the unlabeled test images, to thereby generate labeled test images, (2) detecting the objects for testing in each of the labeled test images and thus (3) generating each of third-party bounding boxes for testing corresponding to each of the objects for testing. Thereafter, the auto labeling device 2000 may perform (i) a process of selecting adjusted bounding boxes for testing, corresponding to the objects for testing, among a test box group comprised of the bounding boxes for testing and the third-party bounding boxes for testing, by using the NMS algorithm, and (ii) a process of setting the adjusted bounding boxes for testing as the bounding boxes for testing.

Next, the test device 2000 may perform a process of allowing the ROI pooling layer 2400 to apply the pooling operation to each of the pyramid feature maps for testing by using the bounding boxes for testing, to thereby generate each of the pooled feature maps for testing.

Next, the auto labeling device 2000 may input the pooled feature maps for testing into the fitness estimation network 2700.

Then, the fitness estimation network 2700 may apply the third fully-connected operation and then the sigmoid operation to the pooled feature maps for testing and thus generate the fitness values for testing which range from 0 to 1.

Herein, the fitness values for testing may be created by estimating differences between (1) first box uncertainty scores for testing of the first class scores for testing, corresponding to the unlabeled test images, outputted from the first classifier 2500 and (2) second box uncertainty scores for testing of the second class scores for testing, corresponding to the unlabeled test images, outputted from the second classifier 2600.

And, the auto labeling device 2000 may determine whether the fitness values for testing are equal to or greater than the preset criterion fitness value.

Herein, first pooled feature maps for testing, among the pooled feature maps for testing, may be inputted into the first classifier 2500, where the first pooled feature maps for testing correspond to first fitness values for testing equal to or greater than the preset criterion fitness value among the fitness values for testing, and as described by referring to FIG. 5, the first classifier 2500 may generate each of the first class scores for testing and each of the first box uncertainty scores for testing, respectively corresponding to each of the bounding boxes for testing.

And, second pooled feature maps for testing, among the pooled feature maps for testing, may be inputted into the second classifier 2600, where the second pooled feature maps for testing correspond to second fitness values for testing less than the preset criterion fitness value among the fitness values for testing, and as described by referring to FIG. 5, the second classifier 2600 may generate each of second class scores for testing and each of the second box uncertainty scores for testing, respectively corresponding to each of the bounding boxes for testing. Herein, the second box uncertainty scores for testing may be adjusted by the scale parameter such that a range of the second box uncertainty scores for testing corresponds to a range of the first box uncertainty scores for testing.

Next, the auto labeling device 2000 may perform a process of generating the bounding boxes for testing, first class information for testing corresponding to the first class scores for testing, and second class information for testing corresponding to the second class scores for testing, for each of the unlabeled test images, to thereby generate labeled images.

And the auto labeling device 2000 may perform a process of transmitting, to a labeler, specific labeled images, among the generated labeled images, including specific bounding boxes for testing, among the bounding boxes for testing, to thereby allow the labeler to verify the specific labeled images, where each of the specific bounding boxes for testing is selected by referring to (1) a first box uncertainty score for testing, among the first box uncertainty scores for testing, equal to or greater than a preset criterion uncertainty score and (2) a second box uncertainty score for testing, among the second box uncertainty scores for testing, equal to or greater than the preset criterion uncertainty score.

Further, the auto labeling device 2000 may perform a process of re-training at least one of the first classifier, the second classifier, the object detection network, and the feature pyramid network, using one or more fifth losses calculated by referring to the specific labeled images and verified labeled images where the verified labeled images are verified by the labeler.

The present disclosure has an effect of reducing time of inspection by selectively inspecting only images that are difficult to label among images auto-labeled by the auto labeling device.

The present disclosure has another effect of increasing a throughput of the labeling for entire images by allowing an unskilled inspector to keep up with a throughput of the auto labeling device via selectively inspecting only the images that are difficult to label among the images automatically labeled by the auto labeling device.

The present disclosure has still another effect of reducing a cost by decreasing the number of inspectors via selectively inspecting only the images that are difficult to label among the images automatically labeled by the auto labeling device.

The present disclosure has still yet another effect of improving a throughput of the auto labeling, without degrading an accuracy of the auto labeling by selectively inspecting only the images that are difficult to label among the images automatically labeled by the auto labeling device.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training an auto labeling device capable of performing automatic verification by using uncertainty scores of auto-labeled labels, comprising steps of:
   (a) a learning device performing (i) a process of inputting or allowing the auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (ii) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (iii) a process of training the object detection network and the feature pyramid network, using one or more first losses calculated by referring to the first bounding boxes for training and ground truths of the first unlabeled training images;

(b) the learning device performing (i) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (ii) a process of instructing or allowing the auto labeling device to instruct an ROI (region of interest) pooling layer of the auto labeling device to apply at least one pooling operation to each of the second pyramid feature maps for training by using the second bounding boxes for training, to thereby generate each of pooled feature maps for training, and at least one of (ii-1) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii-2) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (iii) one of (iii-1) a process of training the first classifier using one or more second losses calculated by referring to the first class scores for training and ground truths corresponding to the second bounding boxes for training, and (iii-2) a process of training the second classifier using one or more third losses calculated by referring to the second class scores for training and the ground truths corresponding to the second bounding boxes for training.

2. The method of claim 1, wherein, at the step of (b), the learning device performs (i) a process of inputting or allowing the auto labeling device to input the pooled feature maps for training into a fitness estimation network of the auto labeling device, to thereby allow the fitness estimation network to apply at least one third fully-connected operation and then at least one sigmoid operation to the pooled feature maps for training and thus to generate fitness values for training which range from 0 to 1, wherein the fitness values for training are created by estimating differences between (1) first uncertainty scores for training in outputs, corresponding to the second unlabeled training images, from the first classifier and (2) second uncertainty scores for training in outputs, corresponding to the second unlabeled training images, from the second classifier, and (ii) a process of inputting or allowing the auto labeling device to input first pooled feature maps for training, among the pooled feature maps for training, into the first classifier, wherein the first pooled feature maps for training correspond to first fitness values for training equal to or greater than a preset criterion fitness value among the fitness values for training, and a process of inputting or allowing the auto labeling device to input second pooled feature maps for training, among the pooled feature maps for training, into the second classifier, wherein the second pooled feature maps for training correspond to second fitness values for training less than the preset criterion fitness value among the fitness values for training, and wherein the learning device performs (i) a process of calculating one or more fourth losses by referring to the first box uncertainty scores for training and adjusted second box uncertainty scores for training, wherein the adjusted second box uncertainty scores for training are created by adjusting each of the second box uncertainty scores for training by a scale parameter such that a range of the adjusted second box uncertainty scores for training corresponds to a range of the first box uncertainty scores for training, (ii) a process of updating the scale parameter by using the fourth losses, and (iii) a process of training the fitness estimation network by referring to the fourth losses.

3. The method of claim 2, wherein the learning device performs a process of clipping the cross entropy losses, created by referring to the fourth losses, if the cross entropy losses lie outside a range from 0 to 1 such that a range of the clipped cross entropy losses becomes a range from 0 to 1, and a process of training the fitness estimation network by using the clipped cross entropy losses.

4. The method of claim 1, wherein, at the step of (a), the learning device performs (i) a process of transmitting or allowing the auto labeling device to transmit the first unlabeled training images to at least one third-party object detection network, to thereby allow the third-party object detection network to (1) label the first unlabeled training images, to thereby generate first labeled training images, (2) detect the first objects for training in each of the first labeled training images and thus (3) generate each of first third-party bounding boxes for training corresponding to each of the first objects for training, (ii) a process of selecting first adjusted bounding boxes for training, corresponding to the first objects for training, among a first training box group comprised of the first bounding boxes for training and the first third-party bounding boxes for training, by using an NMS (non-maximal suppression) algorithm, and (iii) a process of setting the first adjusted bounding boxes for training as the first bounding boxes for training, and wherein, at the step of (b), the learning device performs (i) a process of transmitting the second unlabeled training images to the third-party object detection network, to thereby allow the third-party object detection network to (1) label the second unlabeled training images, to thereby generate second labeled training images, (2) detect the second objects for training in each of the second labeled training images and thus (3) generate each of second third-party bounding boxes for training corresponding to each of the second objects for training, (ii) a process of selecting second adjusted bounding boxes for training, corresponding to the second objects for training, among a second training box group comprised of the second bounding boxes for training and the second third-party bounding boxes for training, by using the NMS (non-maximal suppression) algorithm, and (iii) a process of setting the second adjusted bounding boxes for training as the second bounding boxes for training.

5. The method of claim 1, wherein, at the step of (b), the learning device performs a process of allowing the first classifier to apply at least one rectifying operation and then the PDF operation to results of the first fully-connected operation, and wherein the rectifying operation converts values of the results such that the values of the results are equal to or greater than 0.

6. A method for auto labeling while performing automatic verification by using uncertainty scores of auto-labeled labels, comprising steps of:

(a) on condition that a learning device has performed (I) (I-1) a process of inputting or allowing an auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (I-2) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (I-3) a process of training the object detection network and the feature pyramid network, using one or more first losses calculated by referring to the first bounding boxes for training and ground truths of the first unlabeled training images, and (II) (II-1) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (II-2) a process of allowing an ROI (region of interest) pooling layer of the auto labeling device to apply at least one pooling operation to each of the second pyramid feature maps for training by using the second bounding boxes for training, to thereby generate each of pooled feature maps for training, and at least one of (i) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (II-3) one of (i) a process of training the first classifier using one or more second losses calculated by referring to the first class scores for training and ground truths corresponding to the second bounding boxes for training, and (ii) a process of training the second classifier using one or more third losses calculated by referring to the second class scores for training and the ground truths corresponding to the second bounding boxes for training, then if one or more unlabeled test images are acquired, the auto labeling device performing (a1) a process of inputting the unlabeled test images into the feature pyramid network, to thereby allow the feature pyramid network to generate pyramid feature maps for testing with different resolutions, and (a2) a process of inputting the pyramid feature maps for testing into the object detection network, to thereby allow the object detection network to detect one or more objects for testing in each of the pyramid feature maps for testing and thus to generate each of bounding boxes for testing corresponding to each of the objects for testing;

(b) the auto labeling device performing (i) a process of allowing the ROI pooling layer to apply the pooling operation to each of the pyramid feature maps for testing by using the bounding boxes for testing, to thereby generate each of pooled feature maps for testing, and (ii) at least one of (ii-1) a process of inputting the pooled feature maps for testing into the first classifier, to thereby allow the first classifier to apply the first fully-connected operation and then the PDF operation to each of the pooled feature maps for testing and thus to generate each of first class scores for testing and each of first box uncertainty scores for testing, respectively corresponding to each of the bounding boxes for testing, and (ii-2) a process of inputting the pooled feature maps for testing into the second classifier, to thereby allow the second classifier to (1) generate k copies of each of the pooled feature maps for testing, (2) randomly set at least one element in each of the k copies of each of the pooled feature maps for testing as 0, to thereby generate randomly-zeroed k copies thereof, (3) apply the second fully-connected operation and then the softmax operation to the randomly-zeroed k copies of each of the pooled feature maps for testing, and thus (4) generate each of second class scores for testing and each of second box uncertainty scores for testing, respectively corresponding to each of the bounding boxes for testing; and (c) the auto labeling device performing (i) a process of generating the bounding boxes for testing, first class information for testing corresponding to the first class scores for testing, and second class information for testing corresponding to the second class scores for testing, for each of the unlabeled test images, to thereby generate labeled images, and (ii) a process of transmitting, to a labeler, specific labeled images, among the generated labeled images, including specific bounding boxes for testing, among the bounding boxes for testing, to thereby allow the labeler to verify the specific labeled images, wherein each of the specific bounding boxes for testing is selected by referring to (1) a first box uncertainty score for testing, among the first box uncertainty scores for testing, equal to or greater than a preset criterion uncertainty score and (2) a second box uncertainty score for testing, among the second box uncertainty scores for testing, equal to or greater than the preset criterion uncertainty score.

7. The method of claim 6, wherein, at the step of (b), the auto labeling device performs (i) a process of inputting the pooled feature maps for testing into the fitness estimation network, to thereby allow the fitness estimation network to apply at least one third fully-connected operation and then at least one sigmoid operation to the pooled feature maps for testing and thus to generate fitness values for testing which range from 0 to 1, wherein the fitness values for testing are created by estimating differences between (1) first uncertainty scores for testing in outputs, corresponding to the unlabeled test images, from the first classifier and (2) second uncertainty scores for testing in outputs, corresponding to the unlabeled test images, from the second classifier, and (ii) a process of inputting first pooled feature maps for testing, among the pooled feature maps for testing, into the first classifier, wherein the first pooled feature maps for testing correspond to first fitness values for testing equal to or greater than a preset criterion fitness value among the fitness values for testing, and a process of inputting second pooled feature maps for testing, among the pooled feature maps for testing, into the second classifier, wherein the second pooled feature maps for testing correspond to second fitness values for testing less than the preset criterion fitness value among the fitness values for testing, and wherein the learning device performs a process of setting adjusted second box uncertainty scores for testing as the second box uncertainty scores for testing, and wherein the adjusted second box uncertainty scores for testing are created by adjusting each of the second box uncertainty scores for testing by a scale parameter such that a range of the adjusted second box uncertainty scores for testing corresponds to a range of the first box uncertainty scores for testing.

8. The method of claim 6, wherein, at the step of (b), the auto labeling device performs (i) a process of transmitting the unlabeled test images to at least one third-party object detection network, to thereby allow the third-party object detection network to (1) label the unlabeled test images, to thereby generate labeled test images, (2) detect the objects for testing in each of the labeled test images and thus (3) generate each of third-party bounding boxes for testing corresponding to each of the objects for testing, (ii) a process of selecting adjusted bounding boxes for testing, corresponding to the objects for testing, among a test box group comprised of the bounding boxes for testing and the third-party bounding boxes for testing, by using an NMS (non-maximal suppression) algorithm, and (iii) a process of setting the adjusted bounding boxes for testing as the bounding boxes for testing.

9. The method of claim 6, wherein, at the step of (b), the auto labeling device performs a process of allowing the first classifier to apply at least one rectifying operation and then the PDF operation to results of the first fully-connected operation, and wherein the rectifying operation converts values of the results such that the values of the results are equal to or greater than 0.

10. The method of claim 6, further comprising a step of:
(d) the auto labeling device performing a process of re-training at least one of the first classifier, the second classifier, the object detection network, and the feature pyramid network, using one or more fifth losses calculated by referring to the specific labeled images and verified labeled images wherein the verified labeled images are verified by the labeler.

11. A learning device for training an auto labeling device capable of performing automatic verification by using uncertainty scores of auto-labeled labels, comprising:
at least one memory that stores instructions; and
at least one processor configured to execute the instructions to perform: (I) (i) a process of inputting or allowing the auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (ii) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (iii) a process of training the object detection network and the feature pyramid network, using one or more first losses calculated by referring to the first bounding boxes for training and ground truths of the first unlabeled training images, (II) (i) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (ii) a process of instructing or allowing the auto labeling device to instruct an ROI (region of interest) pooling layer of the auto labeling device to apply at least one pooling operation to each of the second pyramid feature maps for training by using the second bounding boxes for training, to thereby generate each of pooled feature maps for training, and at least one of (ii-1) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii-2) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (iii) one of (iii-1) a process of training the first classifier using one or more second losses calculated by referring to the first class scores for training and ground truths corresponding to the second bounding boxes for training, and (iii-2) a process of training the second classifier using one or more third losses calculated by referring to the second class scores for training and the ground truths corresponding to the second bounding boxes for training.

12. The learning device of claim 11, wherein, at the process of (II), the processor performs (i) a process of inputting or allowing the auto labeling device to input the pooled feature maps for training into a fitness estimation network of the auto labeling device, to thereby allow the fitness estimation network to apply at least one third fully-connected operation and then at least one sigmoid operation to the pooled feature maps for training and thus to generate fitness values for training which range from 0 to 1, wherein the fitness values for training are created by estimating differences between (1) first uncertainty scores for training in outputs, corresponding to the second unlabeled training images, from the first classifier and (2) second uncertainty scores for training in outputs, corresponding to the second unlabeled training images, from the second classifier, and (ii) a process of inputting or allowing the auto labeling device to input first pooled feature maps for training, among the pooled feature maps for training, into the first classifier, wherein the first pooled feature maps for training correspond to first fitness values for training equal to or greater than a preset criterion fitness value among the fitness values for training, and a process of inputting or allowing the auto labeling device to input second pooled feature maps for training, among the pooled feature maps for training, into the second classifier, wherein the second pooled feature maps for training correspond to second fitness values for training less than the preset criterion fitness value among the fitness values for training, and
wherein the processor performs (i) a process of calculating one or more fourth losses by referring to the first box uncertainty scores for training and adjusted second box uncertainty scores for training, wherein the adjusted second box uncertainty scores for training are created by adjusting each of the second box uncertainty scores for training by a scale parameter such that a range of the adjusted second box uncertainty scores for training corresponds to a range of the first box uncertainty scores for training, (ii) a process of updating the scale parameter by using the fourth losses, and (iii) a process of training the fitness estimation network by referring to the fourth losses.

13. The learning device of claim 12, wherein the processor performs a process of clipping the cross entropy losses, created by referring to the fourth losses, if the cross entropy losses lie outside a range from 0 to 1 such that a range of the clipped cross entropy losses becomes a range from 0 to 1, and a process of training the fitness estimation network by using the clipped cross entropy losses.

14. The learning device of claim 11, wherein, at the process of (I), the processor performs (i) a process of transmitting or allowing the auto labeling device to transmit the first unlabeled training images to at least one third-party object detection network, to thereby allow the third-party object detection network to (1) label the first unlabeled training images, to thereby generate first labeled training images, (2) detect the first objects for training in each of the first labeled training images and thus (3) generate each of first third-party bounding boxes for training corresponding to each of the first objects for training, (ii) a process of selecting first adjusted bounding boxes for training, corresponding to the first objects for training, among a first training box group comprised of the first bounding boxes for training and the first third-party bounding boxes for training, by using an NMS (non-maximal suppression) algorithm, and (iii) a process of setting the first adjusted bounding boxes for training as the first bounding boxes for training, and
wherein, at the process of (II), the processor performs (i) a process of transmitting the second unlabeled training images to the third-party object detection network, to thereby allow the third-party object detection network to (1) label the second unlabeled training images, to thereby generate second labeled training images, (2) detect the second objects for training in each of the second labeled training images and thus (3) generate each of second third-party bounding boxes for training corresponding to each of the second objects for training, (ii) a process of selecting second adjusted bounding boxes for training, corresponding to the second objects for training, among a second training box group comprised of the second bounding boxes for training and the second third-party bounding boxes for training, by using the NMS (non-maximal suppression) algorithm, and (iii) a process of setting the second adjusted bounding boxes for training as the second bounding boxes for training.

15. The learning device of claim 11, wherein, at the process of (II), the processor performs a process of allowing the first classifier to apply at least one rectifying operation and then the PDF operation to results of the first fully-connected operation, and wherein the rectifying operation converts values of the results such that the values of the results are equal to or greater than 0.

16. An auto labeling device for auto labeling while performing automatic verification by using uncertainty scores of auto-labeled labels, comprising:
at least one memory that stores instructions; and
at least one processor configured to execute the instructions to perform: (I) on condition that a learning device has performed (I-a) a process of inputting or allowing the auto labeling device to input one or more first unlabeled training images into a feature pyramid network of the auto labeling device, to thereby allow the feature pyramid network to apply at least one convolution operation to each of the first unlabeled training images and thus to generate first pyramid feature maps for training with different resolutions for each of the first unlabeled training images, (I-b) a process of inputting or allowing the auto labeling device to input the first pyramid feature maps for training into an object detection network of the automatic labeling device, to thereby allow the object detection network to detect one or more first objects for training in each of the first pyramid feature maps for training and thus to generate each of first bounding boxes for training corresponding to each of the first objects for training, and (I-c) a process of training the object detection network and the feature pyramid network, using one or more first losses calculated by referring to the first bounding boxes for training and ground truths of the first unlabeled training images, (I-d) a process of inputting or allowing the auto labeling device to input one or more second unlabeled training images into the feature pyramid network, to thereby allow the feature pyramid network to generate second pyramid feature maps for training with different resolutions, and a process of inputting or allowing the auto labeling device to input the second pyramid feature maps for training into the object detection network, to thereby allow the object detection network to detect one or more second objects for training in each of the second pyramid feature maps for training and thus to generate each of second bounding boxes for training corresponding to each of the second objects for training, (I-e) a process of allowing an ROI (region of interest) pooling layer of the auto labeling device to apply at least one pooling operation to each of the second pyramid feature maps for training by using the second bounding boxes for training, to thereby generate each of pooled feature maps for training, and at least one of (i) a process of inputting or allowing the auto labeling device to input the pooled feature maps for training into a first classifier of the auto labeling device, to thereby allow the first classifier to apply at least one first fully-connected operation and then at least one PDF (probability distribution function) operation to each of the pooled feature maps for training and thus to generate each of first class scores for training and each of first box uncertainty scores for training, respectively corresponding to each of the second bounding boxes for training, and (ii) a process of inputting or allowing the auto labeling device to input the pooled feature maps for training into a second classifier of the auto labeling device, to thereby allow the second classifier to (1) generate k copies of each of the pooled feature maps for training, (2) randomly set at least one element in each of the k copies of each of the pooled feature maps for training as 0, to thereby generate randomly-zeroed k copies thereof, (3) apply at least one second fully-connected operation and then at least one softmax operation to the randomly-zeroed k copies of each of the pooled feature maps for training, and thus (4) generate each of second class scores for training and each of second box uncertainty scores for training, respectively corresponding to each of the second bounding boxes for training, and (I-f) one of (1) a process of training the first classifier using one or more second losses calculated by referring to the first class scores for training and ground truths corresponding to the second bounding boxes for training, and (2) a process of training the second classifier using one or more third losses calculated by referring to the second class scores for training and the ground truths corresponding to the second bounding boxes for training, then if one or more unlabeled test images are acquired, (I-1) a process of inputting the unlabeled test images into the feature pyramid network, to thereby allow the feature pyramid network to generate pyramid feature maps for testing with different resolutions, and (I-2) a process of inputting the pyramid feature maps for testing into the object detection network, to thereby allow the object detection network to detect one or more objects for testing in each of the pyramid feature maps for testing and thus to generate each of bounding boxes for testing corresponding to each of the objects for testing, (II) (i) a process of allowing the ROI pooling layer to apply the pooling operation to each of the pyramid feature maps for testing by using the bounding boxes for testing, to thereby generate each of pooled feature maps for testing, and (ii) at least one of (ii-1) a process of inputting the pooled feature maps for testing into the first classifier, to thereby allow the first classifier to apply the first fully-connected operation and then the PDF operation to each of the pooled feature maps for testing and thus to generate each of first class scores for testing and each of first box uncertainty scores for testing, respectively corresponding to each of the bounding boxes for testing, and (ii-2) a process of inputting the pooled feature maps for testing into the second classifier, to thereby allow the second classifier to (1) generate k copies of each of the pooled feature maps for testing, (2) randomly set at least one element in each of the k copies of each of the pooled feature maps for testing as 0, to thereby generate randomly-zeroed k copies thereof, (3) apply the second fully-connected operation and then the softmax operation to the randomly-zeroed k copies of each of the pooled feature maps for testing, and thus (4) generate each of second class scores for testing and each of second box uncertainty scores for testing, respectively corresponding to each of the bounding boxes for testing, and (III) (i) a process of generating the bounding boxes for testing, first class information for testing corresponding to the first class scores for testing, and second class information for testing corresponding to the second class scores for testing, for each of the unlabeled test images, to thereby generate labeled images, and (ii) a process of transmitting, to a labeler, specific labeled images, among the generated labeled images, including specific bounding boxes for testing, among the bounding boxes for testing, to thereby allow the labeler to verify the specific labeled images, wherein each of the specific bounding boxes for testing is selected by referring to (1) a first box uncertainty score for testing, among the first box uncertainty scores for testing, equal to or greater than a preset criterion uncertainty score and (2) a second box uncertainty score for testing, among the second box uncertainty scores for testing, equal to or greater than the preset criterion uncertainty score.

17. The auto labeling device of claim 16, wherein, at the process of (II), the processor performs (i) a process of inputting the pooled feature maps for testing into the fitness estimation network, to thereby allow the fitness estimation network to apply at least one third fully-connected operation and then at least one sigmoid operation to the pooled feature maps for testing and thus to generate fitness values for testing which range from 0 to 1, wherein the fitness values for testing are created by estimating differences between (1) first uncertainty scores for testing in outputs, corresponding to the unlabeled test images, from the first classifier and (2) second uncertainty scores for testing in outputs, corresponding to the unlabeled test images, from the second classifier, and (ii) a process of inputting first pooled feature maps for testing, among the pooled feature maps for testing, into the first classifier, wherein the first pooled feature maps for testing correspond to first fitness values for testing equal to or greater than a preset criterion fitness value among the fitness values for testing, and a process of inputting second pooled feature maps for testing, among the pooled feature maps for testing, into the second classifier, wherein the second pooled feature maps for testing correspond to second fitness values for testing less than the preset criterion fitness value among the fitness values for testing, and wherein the learning device performs a process of setting adjusted second box uncertainty scores for testing as the second box uncertainty scores for testing, and wherein the adjusted second box uncertainty scores for testing are created by adjusting each of the second box uncertainty scores for testing by a scale parameter such that a range of the adjusted second box uncertainty scores for testing corresponds to a range of the first box uncertainty scores for testing.

18. The auto labeling device of claim 16, wherein, at the process of (II), the processor performs (i) a process of transmitting the unlabeled test images to at least one third-party object detection network, to thereby allow the third-party object detection network to (1) label the unlabeled test images, to thereby generate labeled test images, (2) detect the objects for testing in each of the labeled test images and thus (3) generate each of third-party bounding boxes for testing corresponding to each of the objects for testing, (ii) a process of selecting adjusted bounding boxes for testing, corresponding to the objects for testing, among a test box group comprised of the bounding boxes for testing and the third-party bounding boxes for testing, by using an NMS (non-maximal suppression) algorithm, and (iii) a process of setting the adjusted bounding boxes for testing as the bounding boxes for testing.

19. The auto labeling device of claim 16, wherein, at the process of (II), the processor performs a process of allowing the first classifier to apply at least one rectifying operation and then the PDF operation to results of the first fully-connected operation, and wherein the rectifying operation converts values of the results such that the values of the results are equal to or greater than 0.

20. The auto labeling device of claim 16, wherein the processor further performs:

(IV) a process of re-training at least one of the first classifier, the second classifier, the object detection network, and the feature pyramid network, using one or more fifth losses calculated by referring to the specific labeled images and verified labeled images wherein the verified labeled images are verified by the labeler.

* * * * *